United States Patent
Löthgren et al.

(10) Patent No.: US 10,592,652 B2
(45) Date of Patent: Mar. 17, 2020

(54) PROXIMITY-BASED ACCIDENTAL LOCK SCREEN COMMAND PREVENTION FOR MOBILE COMMUNICATION TERMINAL

(71) Applicant: DORO AB, Malmö (SE)

(72) Inventors: Fredrik Löthgren, Löddeköpinge (SE); Mattias Nilsson, Lund (SE)

(73) Assignee: Doro AB, Malmo (SE)

( * ) Notice: Subject to any disclaimer, the term of this patent is extended or adjusted under 35 U.S.C. 154(b) by 0 days.

(21) Appl. No.: 15/546,984

(22) PCT Filed: Jan. 30, 2015

(86) PCT No.: PCT/EP2015/051975
§ 371 (c)(1),
(2) Date: Jul. 27, 2017

(87) PCT Pub. No.: WO2016/119894
PCT Pub. Date: Aug. 4, 2016

(65) Prior Publication Data
US 2018/0196934 A1    Jul. 12, 2018

(51) Int. Cl.
*G06F 21/00* (2013.01)
*G06F 21/36* (2013.01)
(Continued)

(52) U.S. Cl.
CPC ............ *G06F 21/36* (2013.01); *G06F 3/0488* (2013.01); *G06F 21/32* (2013.01); *H03K 17/945* (2013.01);
(Continued)

(58) Field of Classification Search
CPC ........ G06F 21/36; G06F 21/32; G06F 3/0482; H04W 4/90; H03K 17/945; H04L 63/0861
(Continued)

(56) References Cited

U.S. PATENT DOCUMENTS 10,216,312 B2 * 2/2019 Park .................... G06F 3/0416
2002/0021278 A1 * 2/2002 Hinckley ............. G06F 1/1626
345/156
(Continued)

OTHER PUBLICATIONS

International Search Report for PCT/EP2015/051975 dated Sep. 29, 2015.

*Primary Examiner* — Syed A Zaidi
(74) *Attorney, Agent, or Firm* — Merchant & Gould P.C.

(57) ABSTRACT

A mobile communication terminal (400) has a controller (410), a touch display (430) and a proximity sensor (420). The touch display has an inactive mode (610; FIG. 5A) essentially without user interaction ability, a lock screen mode (620; FIG. 5B) with limited user interaction ability, and an operational mode (650; FIG. 5C). The lock screen mode generally prevents a user from accessing functionality (560) provided by the mobile communication terminal in the operational mode. The controller is operative, in the lock screen mode, to detect actuation (622) of the mobile communication terminal; identify the detected actuation as a user command; evaluate a sensor reading (422) from the proximity sensor; if the sensor reading from the proximity sensor indicates (632) presence near the mobile communication terminal: prevent execution of the user command, provide user feedback (634) by the touch display and continue in the lock screen mode; and if the sensor reading from the proximity sensor does not indicate (638) presence near the mobile communication terminal: execute the user command (640).

17 Claims, 4 Drawing Sheets

(51) Int. Cl.
*H04W 4/90* (2018.01)
*G06F 3/0488* (2013.01)
*H04M 1/67* (2006.01)
*H04L 29/06* (2006.01)
*G06F 21/32* (2013.01)
*H03K 17/945* (2006.01)
*H04M 1/725* (2006.01)

(52) U.S. Cl.
CPC .......... *H04L 63/0861* (2013.01); *H04M 1/67* (2013.01); *H04W 4/90* (2018.02); *G06F 2221/2105* (2013.01); *G06F 2221/2111* (2013.01); *G06F 2221/2147* (2013.01); *G09G 2360/144* (2013.01); *H04M 1/72541* (2013.01); *H04M 2250/12* (2013.01)

(58) Field of Classification Search
USPC .......................................................... 726/17
See application file for complete search history.

(56) References Cited

U.S. PATENT DOCUMENTS

| | | | |
|---|---|---|---|
| 2003/0013496 A1* | 1/2003 | Kim | H04M 19/04 455/567 |
| 2006/0098278 A1* | 5/2006 | Canon | E06B 9/80 359/443 |
| 2010/0248688 A1* | 9/2010 | Teng | H04M 1/67 455/411 |
| 2011/0050446 A1* | 3/2011 | Anderson | G01S 5/0018 340/686.6 |
| 2012/0009896 A1 | 1/2012 | Bandyopadhyay et al. | |
| 2012/0071149 A1 | 3/2012 | Bandyopadhyay et al. | |
| 2013/0229442 A1* | 9/2013 | Yang | G06F 1/1684 345/690 |
| 2014/0123273 A1* | 5/2014 | Matus | G06F 21/32 726/16 |
| 2014/0232633 A1 | 8/2014 | Shultz | |
| 2014/0354567 A1 | 12/2014 | Park et al. | |

* cited by examiner

PROXIMITY-BASED ACCIDENTAL LOCK SCREEN COMMAND PREVENTION FOR MOBILE COMMUNICATION TERMINAL This application is a National Stage Application of PCT/EP2015/051975, filed 30 Jan. 2015, which application is incorporated herein by reference. To the extent appropriate, a claim of priority is made to the above disclosed application.

TECHNICAL FIELD

The present invention generally relates to the field of electronic equipment, and more particularly to a mobile communication terminal providing proximity-based prevention against accidental lock screen commands.

BACKGROUND

Mobile communication terminals, also known as cellular phones, mobile phones or personal digital assistants, have been in ever increasing use for several decades now. In recent years, the most popular type of mobile communication terminal is the one which has a touch-sensitive display screen, or shortly a touch display, as the main input/output device for interaction with the user. Smartphones and tablets are the two dominating device types of this kind. A smartphone with a touch display will therefore be used as a non-limiting example of a mobile communication terminal throughout this document.

The present inventors have identified a problem with smartphones, which has to do with their inherently mobile nature in combination with their inherent susceptibility to accidental actuation by unintentional contact with the touch display. If a smartphone is accidentally actuated in this way, an unwanted function may be performed in and by the smartphone.

Measures have been taken in existing smartphones to prevent such accidental actuation. The prevailing approach is to have a special mode in which the user is generally prevented from accessing the functionality which is offered by the mobile communication terminal in its normal operational mode. The special mode is referred to as a lock screen mode in this document, and the appearance of the touch display in the lock screen mode is referred to as the lock screen.

The lock screen mode is not an idle mode; the touch display is kept turned on at the same screen brightness as in normal operational mode, or at least at a reduced screen brightness with some display visibility remaining. Moreover, certain limited functionality is typically available to the user in the lock screen mode. Such limited functionality typically includes presentation of status icons and information about the current time and date. The limited functionality typically also includes some contents or controls which the user may interact with, such as a message notification control, a missed call notification, an emergency service call control or a camera control. Hence, the user may interact with the services associated with these controls directly from the lock screen.

The lock screen mode can be entered in several different ways. A first way is by a user command from the normal operational mode. A second way is after expiry of an idle timer in the normal operational mode. A third way is by pressing an actuator on the smartphone while in inactive mode. An inactive mode, or idle mode, is a mode essentially without user interaction ability and serves to save power. The touch display is turned off and is not sensitive to touch in the inactive mode. For instance, pressing the power button or the home key on many smartphone models will cause entry into the lock screen mode from the inactive mode.

To exit the lock screen mode and switch to the normal operational mode usually requires some sort of unlock command from the user. A very common type of unlock command is a swipe motion, or slide motion, in a given direction on the lock screen. In some smartphone models, any direction will do. Another common type of unlock command is a passcode enterable by a sequence of taps on digits or characters on a virtual keypad on the lock screen.

The problem that the present inventors have identified is, more specifically, that situations occur more or less frequently where users accidentally enter the lock screen mode from the inactive mode by pressing the relevant actuator (e.g. power button or home button). One usual situation is when the user intends to put away the smartphone and actuates the actuator unintentionally. The situation is particularly common when the smartphone is put in a pocket, briefcase, jogging holder or similar narrow storage space, since the user will have to hold the smartphone in a certain finger grip in order to fit the smartphone into the pocket, etc., and may then reach contact with the actuator inadvertently.

Since the unintentional switch to lock screen occurs when the smartphone is put away, the user will often not notice that the touch display is turned on. As a result, the touch display will be susceptive of touch actuation without the user knowing it, and accidental actuation by contact between the leg or arm of the user and the touch display may take place.

Such accidental actuation may for instance cause a spurious swipe motion on the touch display when the terminal is put into a pocket. Therefore, accidental actuation is not always prevented even if the smartphone's unlock command involves a swipe or slide motion—and likewise for other controls on the lock screen.

If the unlock command is a passcode, repeated accidental actuation may cause repeated spurious taps on digits or characters on the virtual keypad, and hence result in an incorrect passcode being entered repeatedly, whereupon the smartphone will be blocked from further use.

The problem above is accentuated by the diversity of mobile communication terminal users. Nowadays, users of mobile communication terminals are a very heterogeneous group in which there are considerable variations in terms of age, user experience, physiological motor ability, visual capacity, and general user preference.

Particularly for inexperienced or otherwise impaired users, it is desired to improve the prevention against accidental lock screen commands in terms of reliability and user-friendliness.

SUMMARY

It is accordingly an object of the invention to eliminate, alleviate, mitigate or reduce at least some of the problems referred to above, by providing a mobile communication terminal with improved prevention against accidental lock screen commands.

One aspect of the present invention is a mobile communication terminal comprising:

a controller;

a touch display, the touch display having an inactive mode essentially without user interaction ability, a lock screen mode with limited user interaction ability, and an operational mode, the lock screen mode generally preventing a user from accessing functionality provided by the mobile communication terminal in the operational mode; and
a proximity sensor.

The controller is operative, in the lock screen mode, to:
detect actuation of the mobile communication terminal;
identify the detected actuation as a user command;
evaluate a sensor reading from the proximity sensor;
if the sensor reading from the proximity sensor indicates presence near the mobile communication terminal: prevent execution of the user command, provide user feedback by the touch display and continue in the lock screen mode; and
if the sensor reading from the proximity sensor does not indicate presence near the mobile communication terminal: execute the user command.

This mobile communication terminal provides prevention against accidental lock screen commands and yet balances the need for a reliable and user-friendly approach. The use of a proximity sensor for this specific purpose enables detection of potential situations of accidental lock screen actuation when the user is putting away the mobile communication terminal in a pocket, briefcase, jogging holder or similar narrow storage space and is potentially not even aware that the lock screen mode has been entered (if inadvertently pressing e.g. a home key or power key in inactive mode when the mobile communication terminal is being put away for storage).

At the same time, a reliable and user-friendly approach is obtained thanks to the user feedback being given by the touch display.

Other aspects of the invention and its embodiments are defined by the appended patent claims and are further explained in the detailed description section as well as on the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings, in which.

DETAILED DESCRIPTION

Figure 1:
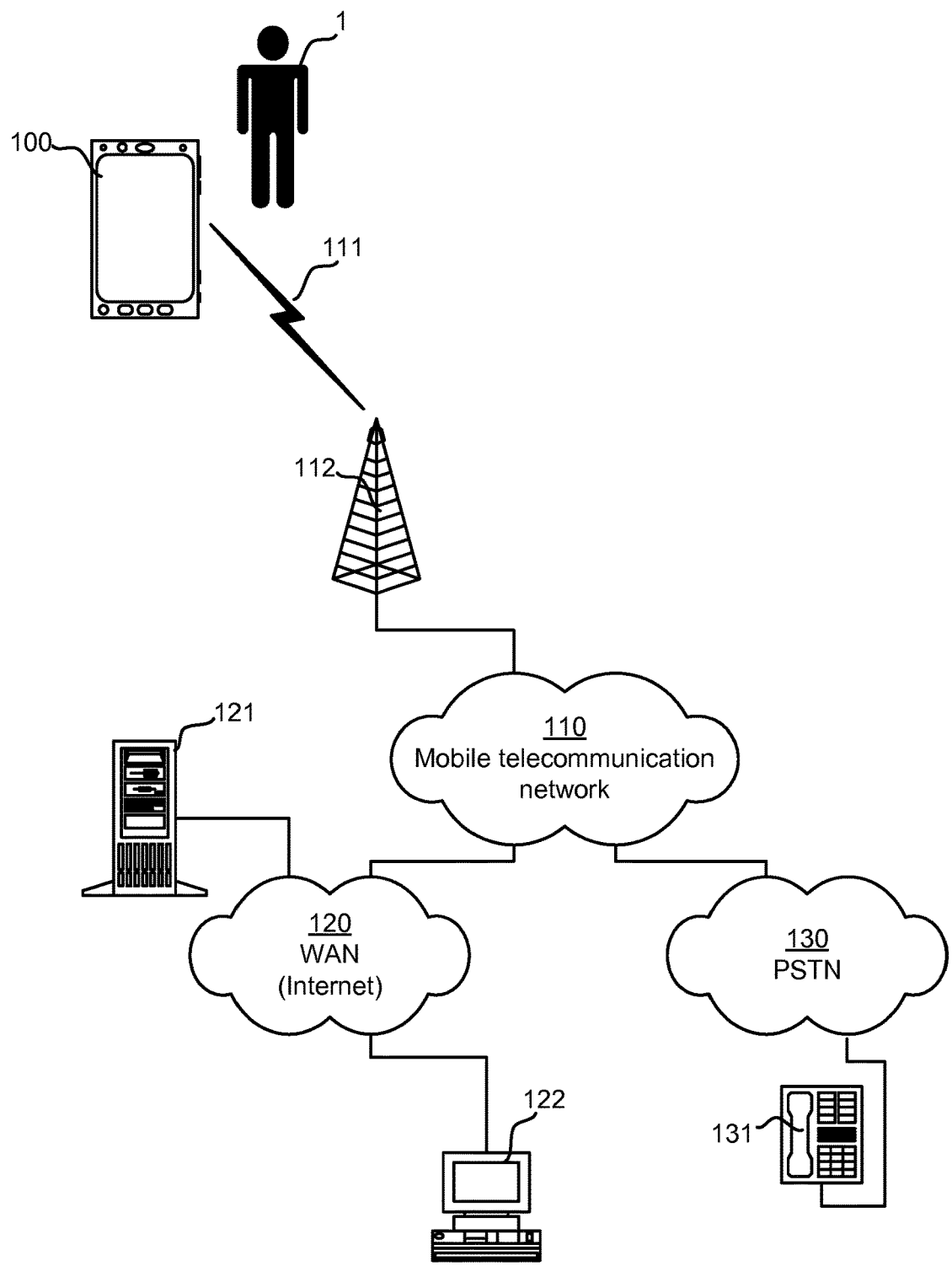
FIG. 1 is a schematic illustration of a non-limiting example of a telecommunication system in which embodiments of the present invention may be exercised.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments of the mobile communication terminal according to the invention, an exemplifying environment in which such embodiments may be exercised will now be briefly described with reference to FIG. 1.

In FIG. 1, a portable electronic device in the form of a mobile communication terminal 100 is part of a cellular telecommunications system. A user 1 of the mobile communication terminal 100 may use different telecommunications services, such as voice calls, Internet browsing, video calls, data calls, facsimile transmissions, still image transmissions, video transmissions, electronic messaging, and e-commerce. The invention is however not limited to any particular set of services.

The mobile communication terminal 100 may connect to a mobile telecommunication network 110 over a radio link 111 and a base station 112. The mobile communication terminal 100 and the mobile telecommunication network 110 may comply with any commercially available mobile telecommunication standard, for instance (without limitation) GSM, UMTS, LTE, D-AMPS, CDMA2000, FOMA and TD-SCDMA. Embodiments of the mobile communication terminal 100 will be described in more detail with reference to the following drawings.

A public switched telephone network (PSTN) 130 is connected to the mobile telecommunication network 110. Telephone terminals of PSTN subscribers may connect to the PSTN 130. In FIG. 1, a stationary telephone 131 is indicated as a mere example of this.

The mobile telecommunication network 110 is operatively associated with a wide area data network 120, which may be the Internet or a part thereof. Server computers 121 and client computers 122 may be connected to the wide area data network 120 to allow communication with the mobile terminal 100.

Figure 2:
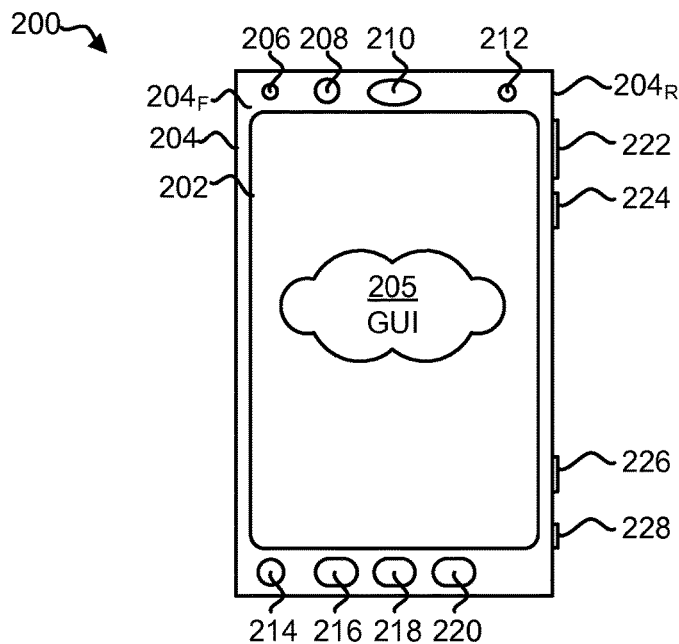
FIG. 2 is a schematic front view of a mobile communication terminal according to one embodiment, in the form of a smartphone having a touch display.

An embodiment 200 of the mobile communication terminal 100 is illustrated in more detail in FIG. 2. The mobile communication terminal 200 is of smartphone-type and has a touch-sensitive display screen 202, or simply a touch display, provided at a front side $204_F$ of an apparatus housing 204 of the mobile communication terminal. The touch display 202 provides a graphical user interface GUI, 205, to a user of the mobile communication terminal 200.

A proximity sensor 206, camera 208, earpiece speaker 210 and ambient light sensor (ALS) 212 are provided at an upper edge portion of the front side $204_F$ of the apparatus housing 204, above the touch display 202. A microphone 214, an options key 216, a home key 218 and a back key 220 are provided at a lower edge portion of the front side $204_F$ of the apparatus housing 204, below the touch display 202.

Volume controls 222, a power button 224, a camera button 226 and a charging connector interface 228 are provided at a lateral side edge $204_R$ of the apparatus housing 204. Also, even though not shown in FIG. 2, the rear side of the apparatus housing 204 may be provided with typical components such as, for instance, a rear camera, a flash, a loudspeaker and an alarm button. Other kinds of mobile communication terminals are also conceivable embodiments of the present invention, such as mobile communication terminals having two main housing parts hinged together to form a clamshell phone or a swivel phone, where at least one display is touch-sensitive.

The internal software and hardware structure of a mobile communication terminal 300, for instance the mobile communication terminal 200 according to the embodiment shown in FIG. 2, will now be described with reference to FIG. 3. Software components are indicated within a dash-dotted frame, whereas hardware components are outside of this frame. The mobile communication terminal has a controller 310 being responsible for general device operations. Any commercially available central processing unit (CPU) or digital signal processor (DSP), or other programmable electronic logic device such as an application-specific integrated circuit (ASIC) or field-programmable gate array (FPGA), may be used to implement the controller 310. The controller 310 has associated memory 312 which includes a work memory (RAM) 314 and a non-volatile storage memory 316, for instance in the form of EEPROM, flash memory (e.g. memory card), hard disk, or any combination thereof. The controller 310 uses the memory 312 for different purposes, for instance for storing file objects as well as data and program instructions for the software in the mobile communication terminal.

The software includes an operating system core 320 on a lower level, application programs 340-346 on an upper level for interaction with the user, and drivers and handlers for the hardware and the application programs on an intermediate level. The intermediate level includes a GUI handler 338 which forms a graphical user interface (such as GUI 205 in FIG. 2) towards the user (such as user 1 in FIG. 1) by controlling the touch display 330 (such as touch display 202 in FIG. 2) as well as other I/O devices which may be included in the mobile communication terminal (such as any of the elements 206-228 in FIG. 2).

An application handler 336 controls the application programs 340-346, which may include a messaging (e.g. SMS, MMS or email) application 340, a contacts application 342, a browser (e.g. www, html) application 344, as well as various other applications 346, such as a call application for voice or video calls, a music player application, a calendar application, a file handling, a control panel or settings application, a camera application, a video game, a word processing application, a spreadsheet application, a drawing application, a slideshow presentation application, a fitness application, etc.

Figure 4:
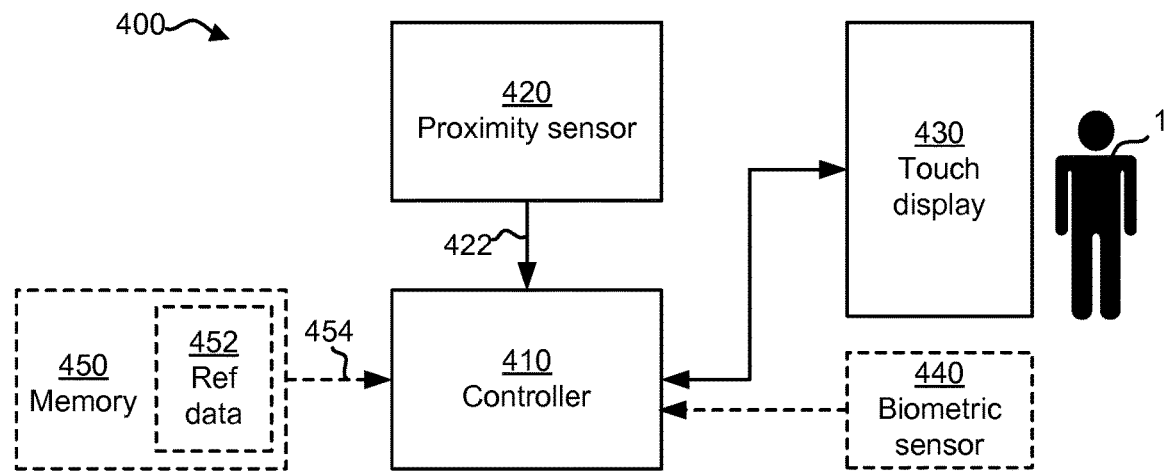
FIG. 4 is a schematic block diagram illustrating some elements of a mobile communication terminal enabled for proximity-based prevention against accidental lock screen commands in accordance with one embodiment.

The software also includes various modules, protocol stacks, drivers, etc., which are commonly designated as communication handler 332 and which provide communication support for a cellular interface 333 and, optionally, a wireless interface for Bluetooth, WLAN, NFC and/or IrDA (commonly designated as 334 in FIG. 4). The cellular interface 333 comprises an internal or external antenna as well as appropriate radio circuitry for establishing and maintaining a wireless link to a base station (e.g. the link 111 and base station 112 in FIG. 1). The radio circuitry comprises a radio transmitter and receiver (transceiver; TX/RX), formed for instance by band pass filters, amplifiers, mixers, local oscillators, low pass filters, AD/DA converters, etc.

Figure 6:
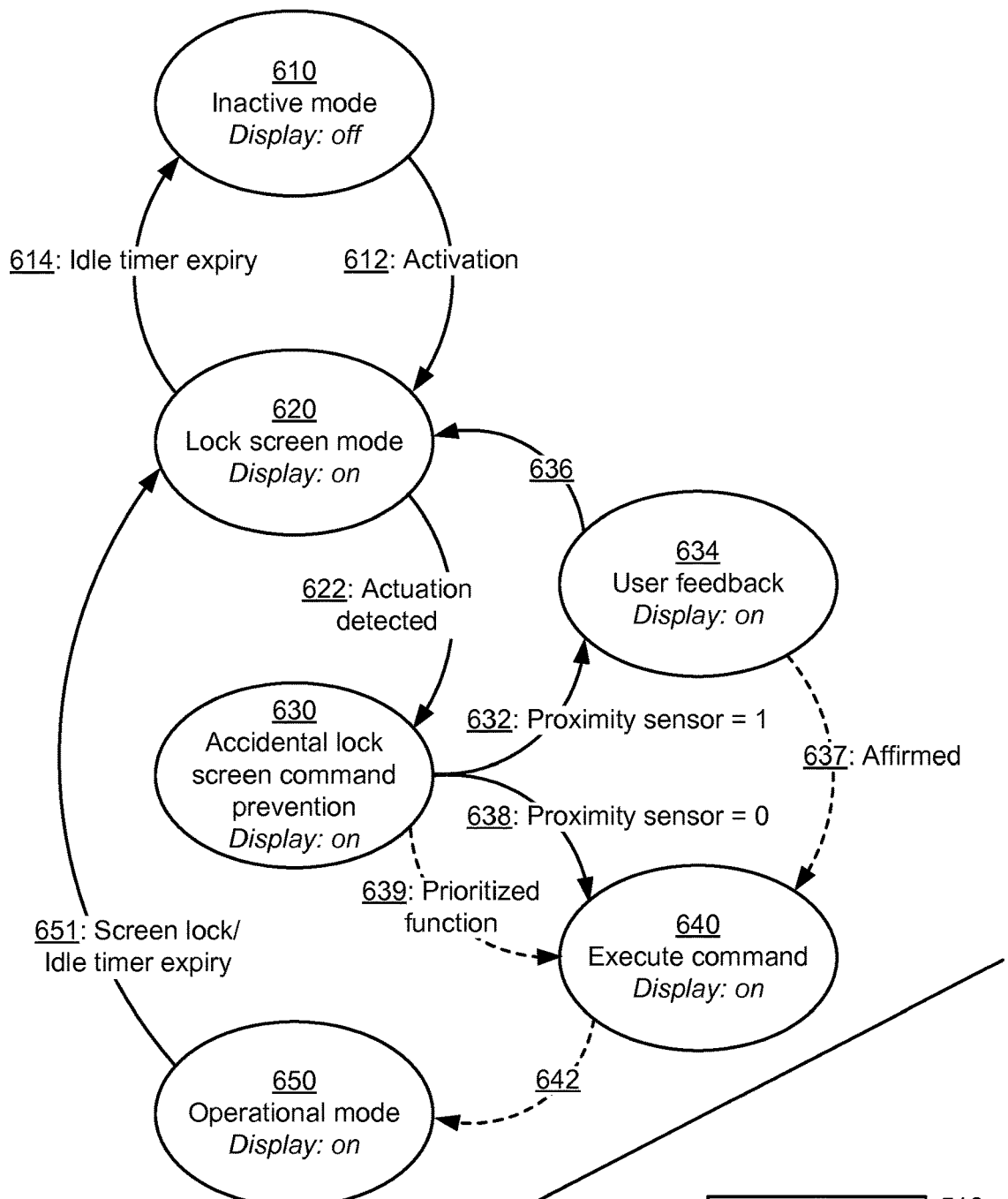
FIG. 6 is an operational state diagram for the mobile communication terminal shown in FIG. 4.

Reference is now made to FIG. 4, which illustrates a mobile communication terminal 400 that provides proximity-based prevention against accidental lock screen commands according to the principles of the present invention. The description is made with exemplifying reference to the embodiments of FIGS. 2 and 3; however, the skilled person readily realizes that the proximity-based accidental lock screen command prevention of the mobile communication terminal 400 could also be applicable to other embodiments. An operational state diagram for the mobile communication terminal 400 is illustrated in FIG. 6.

Figure 3:
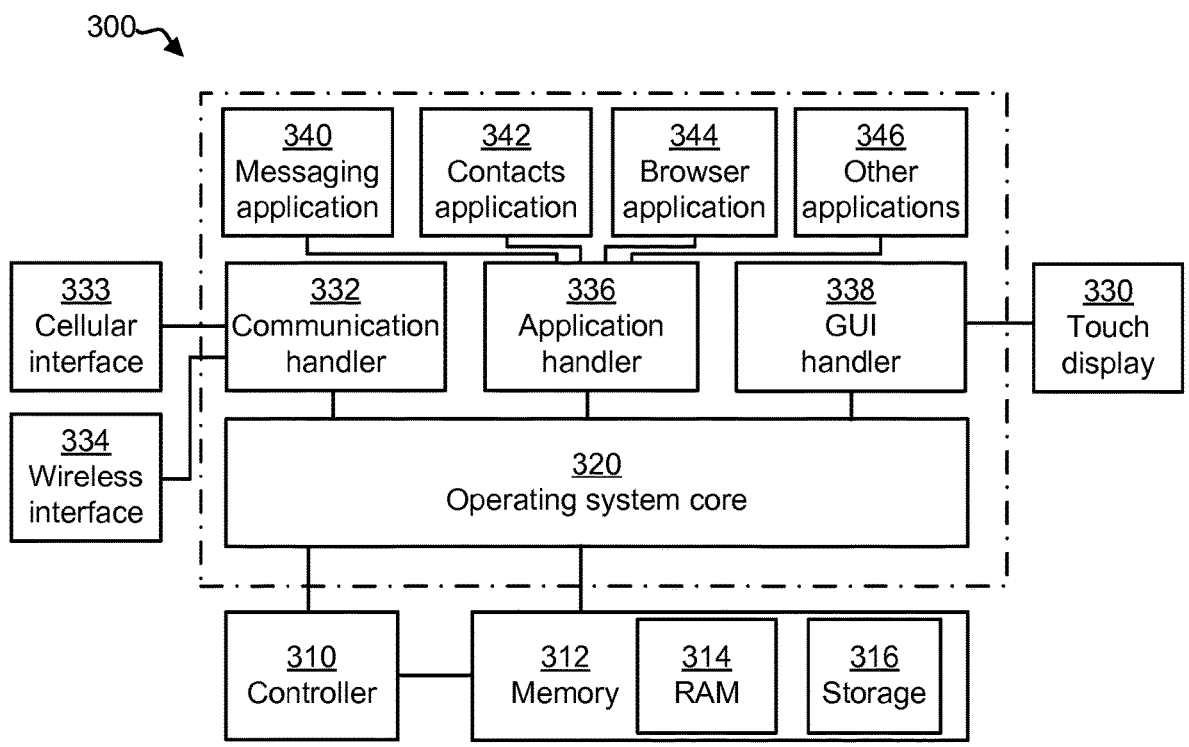
FIG. 3 is a schematic block diagram illustrating the basic internal hardware and software layout of a mobile communication terminal according to one embodiment.

As seen in FIG. 4, the mobile communication terminal 400 comprises a controller 410, for instance implemented by the controller 310 in the embodiment of FIG. 3. The controller 410 is operatively connected with a touch display 430, for instance implemented by the touch display 330 in the embodiment of FIG. 3 and/or the touch display 202 in the embodiment of FIG. 2. The touch display 430 has an inactive mode, a lock screen mode and an operational mode. These modes can be seen at 610, 620 and 650, respectively, in the operational state diagram of FIG. 6, and are moreover exemplified by FIGS. 5A, 5B and 5C, respectively.

The inactive mode is a mode essentially without user interaction ability. Certain background tasks may execute in the inactive mode, but its general purpose is to keep the mobile communication terminal 400 idle at low power consumption, waiting for some action which involves user interaction to occur. To this end, the touch display 430 is typically turned off, both as regards its brightness and its capability of detecting touch. See the empty, black display screen 500 in FIG. 5A.

In contrast, in the operational mode the user may freely interact with the various functionalities and services available in the mobile communication terminal 400. Such user interaction may for instance involve using any of a plurality of applications A1 . . . An, as represented by application icons 560 on the display screen 500 of the mobile communication terminal 400 in FIG. 5C. These applications may, for instance, correspond to the applications 340-346 when the mobile communication terminal 400 is implemented by the mobile communication terminal 300 in FIG. 3.

The lock screen mode is a mode which generally prevents a user from accessing the functionality provided by the mobile communication terminal 400 in the operational mode. Limited functionality will however typically be available to the user in the lock screen mode. The contents of the display screen 500 of the touch display 430 in the lock screen mode will be referred to as a lock screen 500 in the following.

Figures 5A, 5B, 5C:
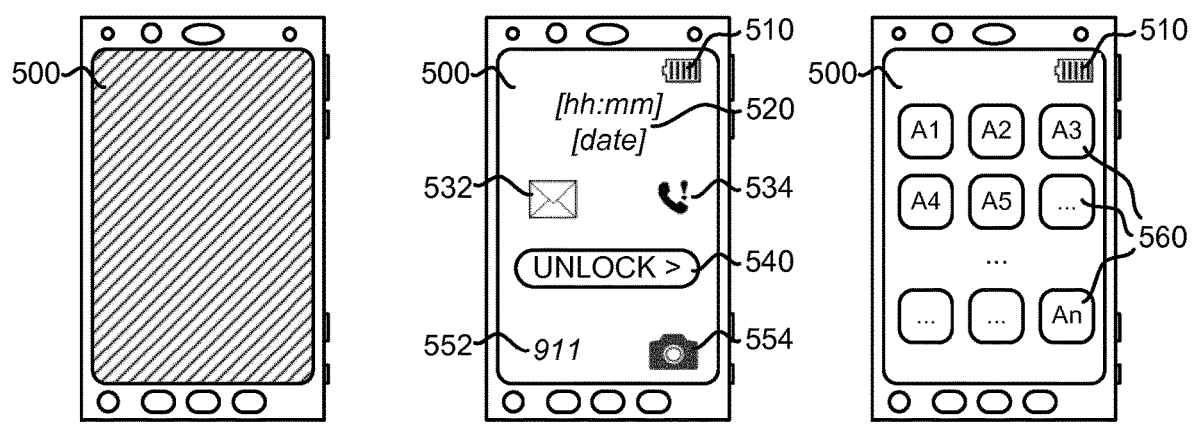
FIG. 5A is a schematic illustration of a mobile communication terminal in an inactive mode according to one embodiment.
FIG. 5B is a schematic illustration of a mobile communication terminal in a lock screen mode according to one embodiment.
FIG. 5C is a schematic illustration of a mobile communication terminal in an operational mode according to one embodiment.

As seen for the lock screen 500 of the mobile communication terminal 400 in FIG. 5B, the touch display 430 is turned on with at least reduced, or alternatively normal, brightness and is therefore capable of presenting certain information to the user 1. Such information typically includes status icons 510 (one example being seen in FIG. 5B in the form of a battery charge level indicator), and information 520 about the current time and date.

In addition to information which is merely presented (one-way) to the user, the lock screen 500 in FIG. 5B provides contents or controls which the user may interact with:

A message notification 532 may be shown to, for instance, alert the user of an arrived SMS, MMS, email or chat message. The user may interact with the message notification 532, for instance by tapping or swiping on it, to read the message and/or make a response to the sender of the message.

A call notification 534 may be shown to, for instance, alert the user of a missed call. The user may interact with the call notification 534, for instance by tapping or swiping on it, to command a return call to the caller of the missed call.

An emergency service call control 552 may be interacted with, for instance by the user tapping or swiping on it, to place an emergency call like 911 or 112.

The user may interact with a camera control 554, for instance by tapping or swiping on it, to invoke a camera application in the mobile communication terminal 400 in order to capture a picture or make a video recording.

In addition or alternatively, the lock screen 500 may have an unlock control 540 which allows the user to unlock the lock screen 500 and move to the operational mode and a touch screen 500 like the one shown in FIG. 5C. Actuation of the unlock control 540 thus represents an unlock command. The actuation may be made in the form of a passcode, such as a PIN or a password, entered by the user on the touch display 430. Alternatively or additionally, the actuation may be made in the form of a swipe motion pattern on the touch display 430. The swipe motion pattern may be a linear pattern, for instance from the left to the right horizontally across the lock screen 500, as is illustrated for the unlock control 540 in FIG. 5B, or it may be a more complex pattern consisting for instance of a sequence of line segments being made by the user moving his finger between different dots in a guide matrix shown on the lock screen 500.

As appears from FIG. 4, the mobile communication terminal 400 also comprises a proximity sensor 420. The proximity sensor 420 may for instance be an IR sensor or a capacitive sensor. In the disclosed embodiment, the proximity sensor 420 is implemented by the aforementioned proximity sensor 206 being provided at the upper edge portion of the apparatus housing 204 for the mobile terminal 200 in FIG. 2. A conventional use of the aforementioned proximity sensor 206 is for detecting the presence of a user's head (or, more specifically, his cheek or ear) near the front side 204$_F$ of the apparatus housing 204 during a voice call session. In the disclosed embodiment of the present invention, i.e. the mobile communication terminal 400, novel and inventive use of the aforementioned proximity sensor 206 is made for the purpose of providing proximity-based prevention against accidental lock screen commands. This will now be described in more detail with particular reference to the exemplifying operational state diagram in FIG. 6.

During periods of inactivity, the mobile communication terminal 400 may occupy the inactive mode 610. As has already been explained previously in this document, the inactive mode is an idle mode essentially without user interaction ability, serving to save power by keeping the touch display 430 turned off and rendering it insensitive to touch. The display screen 500 will be empty and black, as seen in FIG. 5A.

As seen at 612, the controller 410 may detect an activation of the mobile communication terminal 400, and in response cause a switch from the inactive mode 610 into the lock screen mode 620. The activation may for instance be an actuation of the power button 224 or the home key 218.

In the lock screen mode 620, the touch display 430 is activated by turning it on and rendering it sensitive to touch. As a result, the lock screen 500 will be seen, as has been described above for FIG. 5B.

While in the lock screen mode 620, the controller 410 is operative to detect an actuation 622 of the mobile communication terminal 400. If the actuation relates to any of the contents or controls which are possible to interact with on the lock screen 500, the controller 410 will identify the detected actuation as a user command.

The user command may, for instance, be an unlock command resulting from actuation of the unlock control 540, and thus pertain to, for instance, a swipe motion pattern on the touch display 430, or a passcode entered on the touch display 430.

In an alternative embodiment, where the mobile communication terminal 400 has a biometric sensor 440 (see FIG. 4), such as a fingerprint sensor, the detected actuation 622 of the mobile communication terminal 400 may relate to the biometric sensor 440. In this case, the unlock command thus pertains to a sample detected by the biometric sensor 440.

Alternatively, when any of the other controls 532, 534, 552 or 554 on the lock screen 500 in FIG. 5B is the subject of the detected actuation 622, the identified user command will not be an unlock command but instead relate to the message notification 532, call notification 534, emergency service call control 552 or camera control 554.

As has been explained in previous sections of this document, there is a risk that the detected actuation is unintentionally caused for instance when the user is putting away the mobile communication terminal in a pocket, briefcase, jogging holder or similar narrow storage space. In other words, every actuation of the lock screen 500 is potentially accidental.

Accidental lock screen command prevention functionality 630 is therefore provided in accordance with the inventive understanding of the present inventors. The accidental lock screen command prevention functionality 630 is triggered by the detected actuation 622, as seen in FIG. 6. Even though being illustrated, for reasons of clarity, as a state separate from the lock screen mode 620, the accidental lock screen command prevention functionality 630 may advantageously be included in the lock screen mode 620 in an actual implementation.

According to the accidental lock screen command prevention functionality 630, the controller 410 will evaluate a sensor reading 422 from the proximity sensor 420.

If the sensor reading 422 from the proximity sensor 420 indicates presence near the mobile communication terminal 400, as is seen at 632 in FIG. 6, the controller 410 will prevent execution of the user command, provide user feedback by the touch display as is seen at 634 in FIG. 6, and continue in the lock screen mode 620 as is seen at 636 in FIG. 6.

An indication 422 by the proximity sensor 420 of presence near the mobile communication terminal 400 may mean that the actuation 622 has been accidental, for instance caused by the user putting away the mobile communication terminal in a pocket, briefcase, jogging holder or similar narrow storage space. The detected presence may then be, for instance, the inside of a pocket, briefcase, jogging holder or similar narrow storage space. Execution of the user command identified from the detected actuation 622 is therefore blocked in the manner just described, so as to prevent a potentially hazardous and at least unwanted effect from the execution of a user command not intended.

However, at the same time there is a chance that the actuation was indeed made on purpose by the user, and that the proximity sensor 420 detects presence simply because the user's finger or hand is kept at the very position of the proximity sensor 420 on the mobile communication terminal 400. See for instance the proximity sensor 206 being provided at the upper edge portion of the front side 204$_F$ of the apparatus housing 204 in FIG. 2. The user feedback 634 is therefore given to the user 1 by the touch display 430 (still being active, i.e. turned on and sensitive to touch) to account for this possibility.

The user feedback 634 provided by the touch display 430 may comprise explanatory information, serving to explain to the user 1 that execution of the user command has been prevented since the proximity sensor 420, 206 is blocked. The explanatory information may be presented in an alert window or pop-up, or as a full-screen text on the display screen 500 of the touch display 430.

Alternatively or additionally, the user feedback 634 provided by the touch display 430 may comprise instructive information facilitating for the user 1 to make sure that the proximity sensor 420, 206 is not blocked. Such instructive information may for instance comprise a graphical indication of the proximity sensor's 420, 206 position with respect to the apparatus housing, e.g. at the upper edge portion of the front side 204$_F$ of the apparatus housing 204 for the embodiment in FIG. 2. Such graphical indication may be a sketch, illustration, drawing, image, multimedia content, etc.

In some embodiments, the user 1 will have to confirm the explanatory or instructive information by tapping on the display screen 500, before the normal lock screen 500 is presented again according to FIG. 5B.

On the other hand, if the outcome of the accidental lock screen command prevention functionality 630 is that the evaluated sensor reading 422 from the proximity sensor 420 does not indicate presence near the mobile communication terminal 400, as is seen at 638 in FIG. 6, the controller 410 will proceed to execute the user command, as is seen at 640 in FIG. 6.

Therefore, if the detected actuation 622 pertained to the message notification 532, execution of the user command at 640 may result in presentation of the message content on the display screen 500 to the user 1, or creating a response message to the sender of the message, etc, as the case may be.

Correspondingly, if the detected actuation 622 pertained to the call notification 534, execution of the user command at 640 may for instance result in presentation of information about the caller on the display screen 500 to the user 1, or generation of a return call to the caller, as the case may be.

If the detected actuation 622 pertained to the emergency service call control 552, execution of the user command at 640 may result in generation of an emergency call to, for instance, a 911 or 112 emergency service.

If the detected actuation 622 pertained to the camera control 554, execution of the user command at 640 may result in invocation of the camera application in the mobile communication terminal 400, to allow the user 1 to capture a picture or make a video recording, etc.

If the detected actuation 622 pertained to the unlock control 540 (or alternatively the biometric sensor 440, see FIG. 4), execution of the unlock command at 640 will cause a transition 642 to the operational mode 650, as seen in FIG. 5C.

As is seen at 636 in FIG. 6, a transition from the operational mode 650 to the lock screen mode 620 may be caused by a screen lock command, such as actuation of the power button 224, or by expiry of an idle timer. Correspondingly, as is seen at 614 in FIG. 6, a transition from the lock screen mode 620 to the inactive mode 610 may be caused by expiry of an idle timer.

Some alternative embodiments will now be referred to, still with reference to FIG. 6. In one such embodiment, the controller 410 is operative to verify the user command prior to providing the user feedback 634 by the touch display 430. Only if the user command has been successfully verified, will the controller 410 provide the user feedback 634 by the touch display 430. This embodiment has an advantage in that the user feedback 634 will only be performed if the user command is a genuine command in contrast to an unidentifiable spurious actuation of the touch display 430. Hence, power is saved, and unnecessary user feedback is avoided.

In a refined alternative embodiment, the controller 410 is operative to verify the user command even prior to evaluating the sensor reading 422 from the proximity sensor 420. The controller 410 will proceed to evaluate the sensor reading only if the user command has been successfully verified. This embodiment has an advantage in that the sensor reading evaluation as well as the subsequent user feedback 634 or user command execution 640, as the case may be, will only be performed if the user command is a genuine command in contrast to an unidentifiable spurious actuation of the touch display 430. Hence, power is saved.

Particularly when the user command pertains to an actuation of the unlock control 540, i.e. when the user command is an unlock command, the controller 410 may be further operative to verify the unlock command against reference data 452 stored in a memory 450 of the mobile communication terminal 400 (or being accessible to the mobile communication terminal 400). The controller 410 will only execute the unlock command at 640 by causing a transition 642 to the operational mode 650 if the unlock command has been successfully verified. The reference data used for verifying the unlock command may, for instance, be a reference passcode to be matched with the user's passcode entry, a reference pattern to be matched with the swipe motion made by the user on the touch display, biometric reference data to be matched with the biometric sample read by the biometric sensor 440, etc.

In a refined alternative embodiment, the controller 410 is further operative when providing the user feedback 634, to request the user 1 to apply an affirmative user command by actuating the touch display 430 in a different way than the detected actuation 622. For instance, if the actuation 622 pertained to a swipe motion in a given first direction, such as horizontal, the affirmative user command may be given by way of an actuation in a given second direction, such as vertical. If the affirmative user command is applied, see 637, the controller 410 will execute the user command 640 even though the proximity sensor indicated presence. This embodiment has an advantage in user-friendliness, since it will allow the user 1 to have the user command executed (after affirmation) even if he happens to hold the mobile communication terminal 400 in a grip which blocks the proximity sensor 420, 206. Still, thanks to the requirement of a different, affirmative actuation, the risk of accidental lock commands is minimized.

Figure 5D:
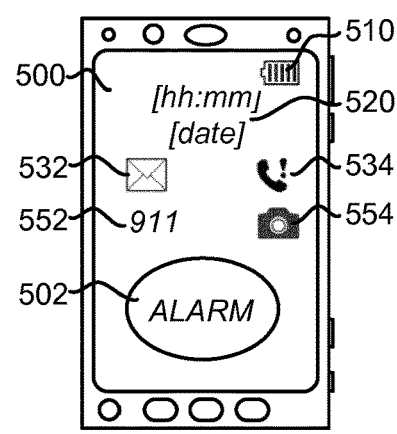
FIG. 5D is a schematic illustration of a mobile communication terminal in a lock screen mode according to an alternative embodiment.

In one alternative embodiment, the limited user interaction ability provided in the lock screen mode (see 620 and FIG. 5D) includes a plurality of functions 502, 532, 534, 552 and 554. At least a first function 502 of this plurality of functions is prioritized. As is seen in FIG. 5D, the first, prioritized function 502 may advantageously pertain to an alarm button, shown on the touch display 430 in the lock screen mode 620, for invoking a telecare service. The telecare service is advantageously one or more of the following:

assistance to the user 1 of the mobile communication terminal 400 from a telecare provider of the telecare service,
attendance of said user 1 by said telecare provider,
medical care of said user 1 by said telecare provider, or
emergency or rescue action to relieve said user 1 in a critical situation.

In this embodiment, the controller 410 is operative to identify the detected actuation as a user command pertaining to one of the plurality of functions 502, 532, 534, 552 or 554. Exceptionally, as seen at 639 in FIG. 6, if the identified user command pertains to the first, prioritized function 502, the user command will be executed by the controller 410 at 640 irrespective of whether the sensor reading 422 from the proximity sensor 420 indicates presence or no presence near the mobile communication terminal 400. Otherwise, if the identified user command pertains to another function 532, 534, 552, 554 among the plurality of functions, the controller 410 will execute or prevent execution of such another function depending on the sensor reading 422 from the proximity sensor 420, as seen at 632 and 638, respectively, in FIG. 6.

This embodiment has an advantage in that it allows for a particularly critical function, such as an alarm to a telecare service, to "short-circuit" the accidental lock screen command prevention functionality 630. Hence, a balance between good accidental lock screen command prevention (for other functions on the lock screen 500) and unrestricted access to the prioritized function is obtained.

It is to be noticed that an alarm button 502 may be included among the other controls 532, 534, 552 and 554 on the lock screen 500 as seen in FIG. 5C, even if the concept of prioritization is not used.

The functionality of the controller 410 as described above for providing proximity-based accidental lock screen command prevention may be implemented as software in some embodiments, for instance in the form of a lock screen application 346 (cf FIG. 3). Therefore, one aspect of the present invention as described herein is a computer program product comprising computer program code means loadable into a memory 450 of a controller 410 in a mobile communication terminal 400 which furthermore comprises a touch display 430 and a proximity sensor 420, the computer program code means being configured, when executed by the controller, for causing the controller to:

detect actuation 622 of the mobile communication terminal 400;
identify the detected actuation as a user command;
evaluate a sensor reading 422 from the proximity sensor 430;
if the sensor reading from the proximity sensor indicates, 632, presence near the mobile communication terminal: prevent execution of the user command, provide user feedback 634 by the touch display and continue in the lock screen mode; and
if the sensor reading from the proximity sensor does not indicate, 638, presence near the mobile communication terminal: execute the user command 640.

In a further alternative embodiment, the mobile communication terminal 400 uses the ambient light sensor 212 (which is conventionally used for automatic screen brightness adjustment of the touch display 430, 202), as said proximity sensor 420. When the user 1 puts away the mobile communication terminal 400 in a pocket, briefcase, jogging holder or similar narrow storage space, the ambient light will be considerable reduced, the ambient light sensor 212 will detect this and the controller 410 may assert that this indicates presence of an object near the touch display, such as the inside of a pocket, briefcase, jogging holder or similar narrow storage space. This embodiment is however presently believed to be potentially less advantageous than all the embodiments referred to above, which are based on the proximity sensor 206, since the ambient light sensor 212 will have difficulties in telling the difference between a generally dark environment (e.g. a dark room) and a pocket, briefcase, jogging holder or similar narrow storage space.

The invention has been described above in detail with reference to embodiments thereof. However, as is readily understood by those skilled in the art, other embodiments are equally possible within the scope of the present invention, as defined by the appended claims.

The invention claimed is:

1. A mobile communication terminal comprising:
   a controller;
   a touch display, the touch display having an inactive mode essentially without user interaction ability, a lock screen mode with limited user interaction ability, and an operational mode, the lock screen mode generally preventing a user from accessing functionality provided by the mobile communication terminal in the operational mode; and
   a proximity sensor,
   wherein the controller is operative, in the lock screen mode, to:
      detect actuation of the mobile communication terminal;
      identify the detected actuation as a user command;
      evaluate a sensor reading from the proximity sensor;
      if the sensor reading from the proximity sensor indicates presence, by the user of the mobile communication terminal, relative to the mobile communication terminal, or presence, by an inside of a storage space in which the user puts away the mobile communication terminal, relative to the mobile communication terminal: prevent execution of the user command, provide user feedback by the touch display and continue in the lock screen mode; and
      if the sensor reading from the proximity sensor does not indicate presence, by the user of the mobile communication terminal, relative to the mobile communication terminal, or presence, by an inside of a storage space in which the user puts away the mobile communication terminal, relative to the mobile communication terminal: execute the user command;
   wherein the limited user interaction ability provided in the lock screen mode includes a plurality of functions, at least a first function of said plurality of functions being prioritized, and wherein the controller is operative to:
      identify the detected actuation as a user command pertaining to one of said plurality of functions;
      exceptionally, if the identified user command pertains to the first, prioritized function, execute the user command irrespective of whether the sensor reading from the proximity sensor indicates presence or no presence, by the user of the mobile communication terminal, relative to the mobile communication terminal, or presence, by an inside of a storage space in which the user puts away the mobile communication terminal, relative to the mobile communication terminal; and otherwise, if the identified user command pertains to another function among said plurality of functions, execute or prevent execution of said another function depending on the sensor reading from the proximity sensor; and wherein the first, prioritized function pertains to an alarm button for invoking a telecare service.

2. The mobile communication terminal according to claim 1, wherein the user command is an unlock command pertaining to one of the following:
a passcode entered on the touch display,
a swipe motion pattern on the touch display,
a sample detected by a biometric sensor in the mobile communication terminal.

3. The mobile communication terminal according to claim 2, wherein the controller is further operative to verify the unlock command against reference data stored in or accessible to the mobile communication terminal, and to only execute the unlock command if the unlock command has been successfully verified.

4. The mobile communication terminal according to claim 3, wherein the controller is further operative, if the unlock command has been successfully verified, to execute the unlock command by causing a transition to the operational mode.

5. The mobile communication terminal according to claim 1, wherein the controller is operative to verify the user command prior to providing the user feedback, and wherein the controller is operative to provide the user feedback by the touch display only if the user command has been successfully verified.

6. The mobile communication terminal according to claim 1, wherein the controller is operative to verify the user command prior to evaluating the sensor reading from the proximity sensor, and wherein the controller is operative to proceed to evaluate the sensor reading only if the user command has been successfully verified.

7. The mobile communication terminal according to claim 1, wherein the user command pertains to one of the following:
a message notification shown on the touch display in the lock screen mode,
an call notification shown on the touch display in the lock screen mode,
an emergency service call control shown on the touch display in the lock screen mode,
a camera control,
an alarm button, shown on the touch display in the lock screen mode, for invoking a telecare service.

8. The mobile communication terminal according to claim 1, wherein the user feedback provided by the touch display comprises explanatory information to the user that execution of the user command has been prevented since the proximity sensor is blocked.

9. The mobile communication terminal according to claim 1, wherein the user feedback provided by the touch display comprises instructive information facilitating for the user to make sure that the proximity sensor is not blocked.

10. The mobile communication terminal according to claim 9, further comprising an apparatus housing, wherein the instructive information comprises a graphical indication of the proximity sensor's position with respect to the apparatus housing.

11. The mobile communication terminal according to claim 10, the touch display being provided at a front side of the apparatus housing, the proximity sensor being provided at an upper edge portion of the apparatus housing and being adapted for detecting presence of the user's head near the front side of the apparatus housing during a voice call session.

12. The mobile communication terminal according to claim 1, further comprising an ambient light sensor for automatic screen brightness adjustment of the touch display, wherein the proximity sensor is said ambient light sensor.

13. The mobile communication terminal according to claim 1, wherein the controller is further operative, when providing the user feedback, to:
request the user to apply an affirmative user command by actuating the touch display in a different way than said detected actuation; and
if the affirmative user command is applied, execute the user command.

14. A method of operating a mobile communication terminal to prevent accidental unlock commands, the method involving:
obtaining a sensor reading from a proximity sensor of the mobile communication terminal indicating presence, by the user of the mobile communication terminal, relative to the mobile communication terminal, or presence, by an inside of a storage space in which the user puts away the mobile communication terminal, relative to the mobile communication terminal; and
providing user feedback by a touch display of the mobile communication terminal, wherein the user feedback is selected from the group consisting of:
explanatory information to a user of the mobile communication terminal that execution of an unlock command by the user has been prevented since the proximity sensor is blocked,
instructive information facilitating for the user to make sure that the proximity sensor is not blocked; and
executing the unlock command when the sensor reading from the proximity sensor does not indicate presence, by the user of the mobile communication terminal, relative to the mobile communication terminal, or presence, by an inside of a storage space in which the user puts away the mobile communication terminal, relative to the mobile communication terminal; and
wherein the instructive information comprises a graphical indication of the proximity sensor's position with respect to an apparatus housing of the mobile communication terminal.

15. The method as defined in claim 14, wherein the unlock command is selected from the group consisting of:
a passcode entered on the touch display,
a swipe motion pattern on the touch display,
a sample detected by a biometric sensor in the mobile communication terminal.

16. A mobile communication terminal comprising:
a controller;
a touch display, the touch display having an inactive mode essentially without user interaction ability, a lock screen mode with limited user interaction ability, and an operational mode, the lock screen mode generally preventing a user from accessing functionality provided by the mobile communication terminal in the operational mode; and a proximity sensor, wherein the controller is operative, in the lock screen mode, to:

detect actuation of the mobile communication terminal;
   identify the detected actuation as a user command;
   evaluate a sensor reading from the proximity sensor;
   if the sensor reading from the proximity sensor indicates presence, by the user of the mobile communication terminal, relative to the mobile communication terminal, or presence, by an inside of a storage space in which the user puts away the mobile communication terminal, relative to the mobile communication terminal: prevent execution of the user command, provide user feedback by the touch display and continue in the lock screen mode; and if the sensor reading from the proximity sensor does not indicate presence, by the user of the mobile communication terminal, relative to the mobile communication terminal, or presence, by an inside of a storage space in which the user puts away the mobile communication terminal, relative to the mobile communication terminal: execute the user command; and wherein the user feedback provided by the touch display comprises explanatory information to the user that execution of the user command has been prevented since the proximity sensor is blocked.

17. A mobile communication terminal comprising:

a controller;

a touch display, the touch display having an inactive mode essentially without user interaction ability, a lock screen mode with limited user interaction ability, and an operational mode, the lock screen mode generally preventing a user from accessing functionality provided by the mobile communication terminal in the operational mode; and a proximity sensor, wherein the controller is operative, in the lock screen mode, to:

detect actuation of the mobile communication terminal;
   identify the detected actuation as a user command;
   evaluate a sensor reading from the proximity sensor;
   if the sensor reading from the proximity sensor indicates presence, by the user of the mobile communication terminal, relative to the mobile communication terminal, or presence, by an inside of a storage space in which the user puts away the mobile communication terminal, relative to the mobile communication terminal: prevent execution of the user command, provide user feedback by the touch display and continue in the lock screen mode; and if the sensor reading from the proximity sensor not indicate presence executing the user command as a result when the sensor reading from the proximity sensor does not indicate presence, by the user of the mobile communication terminal, relative to the mobile communication terminal, or presence, by an inside of a storage space in which the user puts away the mobile communication terminal, relative to the mobile communication terminal; and wherein the user feedback provided by the touch display comprises instructive information facilitating for the user to make sure that the proximity sensor is not blocked.

* * * * *